(12) United States Patent
Matsunaga

(10) Patent No.: US 11,643,077 B2
(45) Date of Patent: May 9, 2023

(54) ESTIMATING DEVICE

(71) Applicant: HONDA MOTOR CO., LTD., Tokyo (JP)

(72) Inventor: Hideki Matsunaga, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 256 days.

(21) Appl. No.: 17/199,909

(22) Filed: Mar. 12, 2021

(65) Prior Publication Data
US 2021/0284146 A1 Sep. 16, 2021

(30) Foreign Application Priority Data

Mar. 16, 2020 (JP) .............................. JP2020-044868

(51) Int. Cl.
| | |
|---|---|
| *B60W 30/095* | (2012.01) |
| *B60W 30/18* | (2012.01) |
| *B60W 40/04* | (2006.01) |
| *B60W 40/06* | (2012.01) |
| *B60W 30/16* | (2020.01) |

(52) U.S. Cl.
CPC ........ *B60W 30/0956* (2013.01); *B60W 30/16* (2013.01); *B60W 30/18154* (2013.01); *B60W 40/04* (2013.01); *B60W 40/06* (2013.01); *B60W 2554/802* (2020.02)

(58) Field of Classification Search
CPC ............ B60W 30/0956; B60W 30/16; B60W 30/18154; B60W 40/04; B60W 40/06; B60W 2554/802
See application file for complete search history.

(56) References Cited

U.S. PATENT DOCUMENTS

| | | | | |
|---|---|---|---|---|
| 11,011,059 | B2 * | 5/2021 | Suzuki | B60W 10/04 |
| 2011/0210866 | A1 * | 9/2011 | David | G08G 1/166 |
| | | | | 340/901 |
| 2016/0114800 | A1 | 4/2016 | Shimizu | |
| 2018/0326982 | A1 * | 11/2018 | Paris | B60W 30/18154 |
| 2019/0111930 | A1 * | 4/2019 | Katsura | G06V 20/58 |
| 2019/0258269 | A1 * | 8/2019 | Yanagihara | G05D 1/0289 |
| 2019/0382013 | A1 | 12/2019 | Li et al. | |
| 2020/0014759 | A1 * | 1/2020 | Wunderlich | G01C 21/3841 |
| 2020/0086859 | A1 * | 3/2020 | McGill, Jr. | G05D 1/0088 |
| 2020/0282992 | A1 * | 9/2020 | Iwasaki | B60W 10/20 |
| 2022/0180749 | A1 * | 6/2022 | Narushima | G08G 1/052 |

FOREIGN PATENT DOCUMENTS

JP 2017-121933 A 7/2017

OTHER PUBLICATIONS

Office Action including search report dated Aug. 1, 2022 issued over the corresponding Chinese Patent Application No. 202110270689.X with the English translation thereof.

* cited by examiner

Primary Examiner — Hussein Elchanti
(74) Attorney, Agent, or Firm — Carrier Shende & Associates, P.C.; Joseph P. Carrier; Fulchand P. Shende

(57) ABSTRACT

An estimation unit performs a primary estimation for estimating the degree of risk based on the speed of the traffic participant, the acceleration of the traffic participant, and the advancing direction of the traffic participant, for a traffic participant whose separation distance from a moving body is equal to or shorter than a first distance, and performs a secondary estimation for estimating the degree of risk based on the scene at the time, for the traffic participant whose separation distance is equal to or greater than the second distance.

8 Claims, 12 Drawing Sheets

| | ROAD GEOMETRY | SCENE 90 | | | | DEGREE OF RISK 92 |
|---|---|---|---|---|---|---|
| | | 1ST MOVING BODY POSITION 96 | 1ST MOVING BODY ADVANCING DIRECTION 98 | 2ND MOVING BODY POSITION 100 | 2ND MOVING BODY ADVANCING DIRECTION (DIRECTION INDICATOR ON/OFF) 102 | |
| | | 94 | | | | |
| 1 | SIGNAL-CONTROLLED INTERSECTION (2 LANES ON EACH SIDE) | L1 | MOVE FORWARD | L3 | OFF | 0 (RISK AVOIDANCE UNNEEDED) |
| 2 | SIGNAL-CONTROLLED INTERSECTION (2 LANES ON EACH SIDE) | L1 | TURN LEFT | L3 | OFF | 0 (RISK AVOIDANCE UNNEEDED) |
| 3 | SIGNAL-CONTROLLED INTERSECTION (2 LANES ON EACH SIDE) | L2 | MOVE FORWARD | L4 | OFF | 0 (RISK AVOIDANCE UNNEEDED) |
| 4 | SIGNAL-CONTROLLED INTERSECTION (2 LANES ON EACH SIDE) | L2 | TURN RIGHT | L4 | ON (LEFT DIRECTION) | 1 (STOP) |
| 5 | SIGNAL-CONTROLLED INTERSECTION (2 LANES ON EACH SIDE) | L2 | TURN RIGHT | L4 | OFF | 1 (STOP) |
| ... | ... | ... | ... | ... | ... | ... |

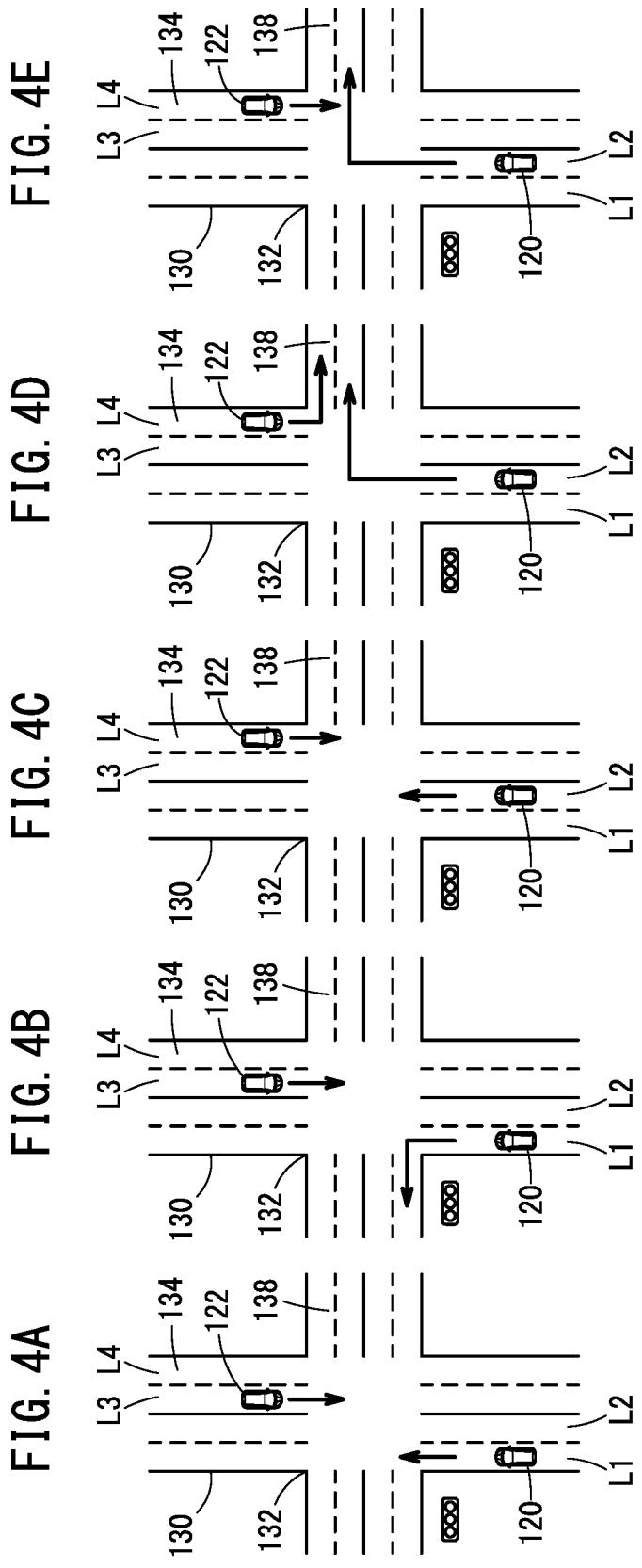

ESTIMATING DEVICE

CROSS-REFERENCE TO RELATED APPLICATION

This application is based upon and claims the benefit of priority from Japanese Patent Application No. 2020-044868 filed on Mar. 16, 2020, the contents of which are incorporated herein by reference.

BACKGROUND OF THE INVENTION

Field of the Invention

The present invention relates to an estimating device that estimates the degree of risk of contact between a moving body and a traffic participant ahead of the moving body.

Description of the Related Art

Japanese Laid-Open Patent Publication No. 2017-121933 discloses a vehicle control device that starts and accelerates a user's own vehicle so as not to come into contact with another traffic participant (oncoming vehicle, pedestrian, etc.) when the user's own vehicle passes through an intersection while turning in road. Specifically, this vehicle control device calculates the position, moving direction, and speed of the traffic participant, identifies the crossing point between the predicted course of the user's own vehicle and the predicted course of the traffic participant, and starts and accelerate the user's own vehicle so that the user's own vehicle and the traffic participant will not passes the crossing point at the same time.

SUMMARY OF THE INVENTION

A process of specifying a crossing point between the predicted course of the user's own vehicle and the predicted course of the traffic participant as in the device of Japanese Laid-Open Patent Publication No. 2017-121933, needs a large amount of calculation. Therefore, as the number of traffic participants increases, the calculation load increases.

The present invention has been devised in view of the problem, and it is an object of the present invention to provide an estimating device capable of reducing calculation load.

According to the first aspect of the present invention, an estimating device includes: an external environment recognition unit configured to recognize environment around a moving body; a distance acquisition unit configured to acquire a first distance from the moving body and a second distance that is longer than the first distance; a scene storage unit configured to store scenes which each are specified by geometry of a road, a position of the moving body and a position of a traffic participant around the moving body, in association with degrees of risk relating to contact between the moving body and the traffic participant; and an estimation part configured to perform a primary estimation which estimates the degree of risk with the traffic participant whose separation distance from the moving body is equal to or shorter than the first distance, based on a speed of the traffic participant, an acceleration of the traffic participant, and an advancing direction of the traffic participant, and perform a secondary estimation which estimates the degree of risk with the traffic participant whose separation distance is equal to or greater than the second distance, based on the scene at that moment.

According to the second aspect of the present invention, an estimating device includes: an external environment recognition unit configured to recognize the environment around a moving body; a time calculation part configured to calculate the expected approach time for the moving body to come close to a traffic participant on an oncoming lane; a scene storage unit configured to store scenes that each are specified by geometry of a road, a position of the moving body and a position of the traffic participant around the moving body, in association with degrees of risk relating to contact between the moving body and the traffic participant; and an estimation part configured to perform a primary estimation which estimates the degree of risk with the traffic participant whose expected approach time is equal to or shorter a first time, based on a speed of the traffic participant, an acceleration of the traffic participant, and an advancing direction of the traffic participant, and perform a secondary estimation which estimates the degree of risk with the traffic participant whose expected approach time is equal to or longer a second time that is longer than the first time, based on the scene at that moment.

According to the present invention, it is possible to reduce the load of calculation performed to estimate the degree of risk of contact between a moving body and a traffic participant.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a diagram showing scene-risk information;

FIGS. 4A, 4B, 4C, 4D, and 4E are diagrams showing specific examples of different scenes in FIG. 3;

DESCRIPTION OF THE PREFERRED EMBODIMENTS

Hereinafter, the estimating devices according to the present invention will be detailed by describing preferred embodiments with reference to the accompanying drawings.

1. First Embodiment

1.1. Configuration of Moving Body Control Device 10 and Estimating Device 36

Figure 1:
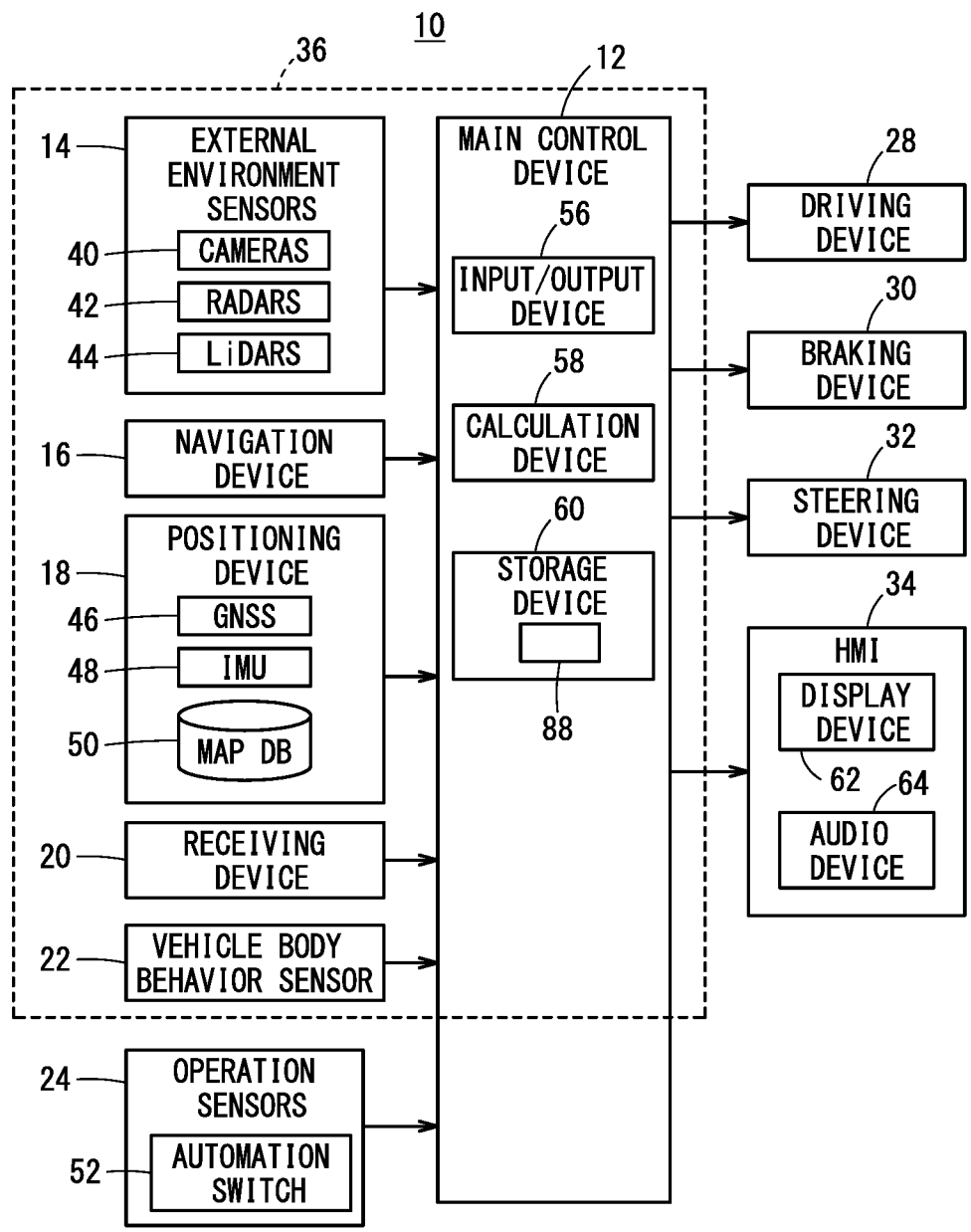
FIG. 1 is a block diagram of a moving body control device including an estimating device.
Figure 5:
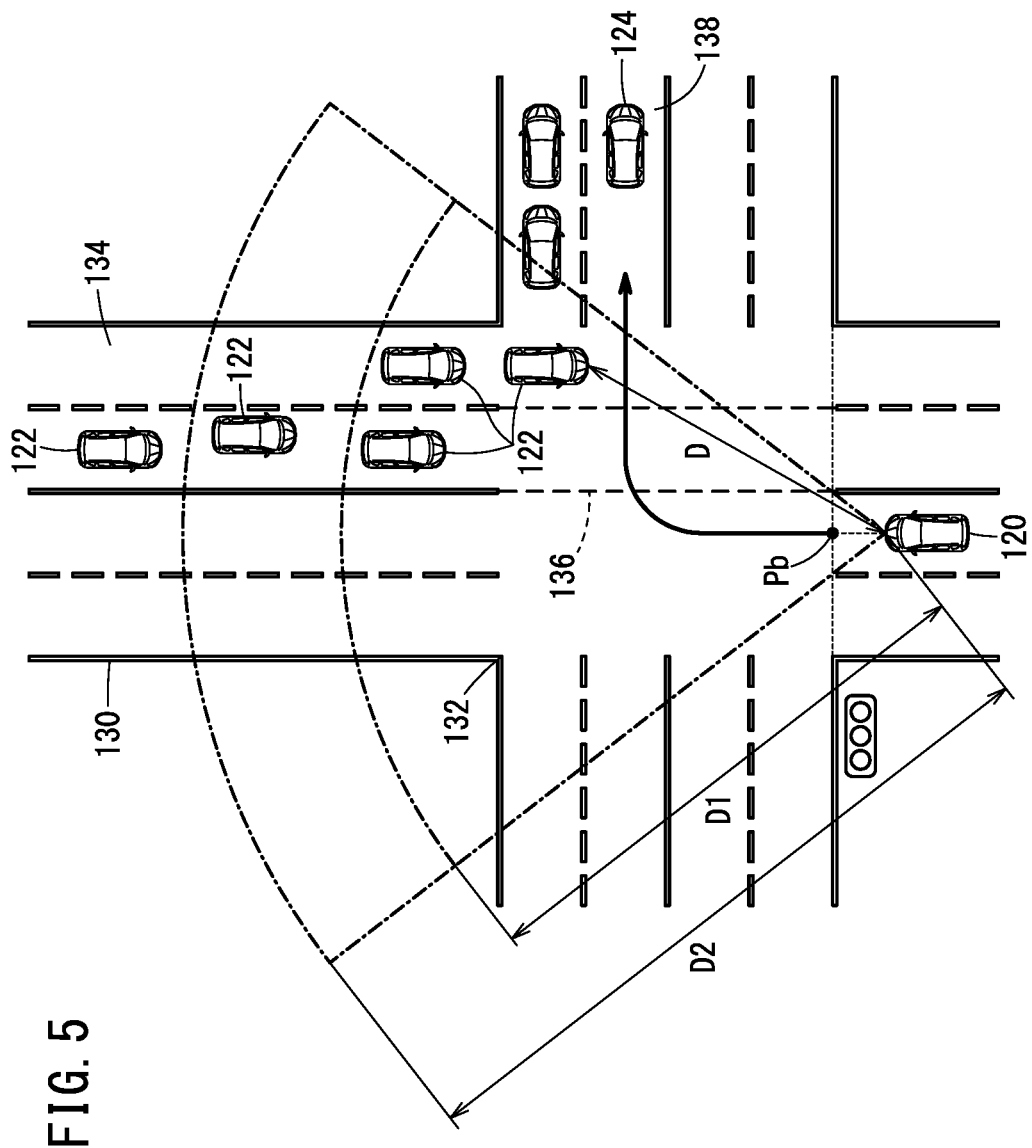
FIG. 5 is a diagram showing a situation in which the degree of risk is estimated.

The configuration of a moving body control device 10 including an estimating device 36 will be described with reference to FIG. 1. The moving body control device 10 is provided on a first moving body 120 (FIG. 5). The first moving body 120 is, for example, a vehicle (user's own vehicle). The moving body control device 10 has a so-called driving support function or an automated driving function, which controls the speed V and steering of the first moving body 120 regardless of the driver's intention.

The moving body control device 10 includes a main control device 12, a group of input devices that supply diverse pieces of information to the main control device 12, and a group of output devices that operate the first moving body 120 based on diverse pieces of information output from the main control device 12. The group of input devices includes external environment sensors 14, a navigation device 16, a positioning device 18, a receiving device 20, a vehicle body behavior sensor 22 and operation sensors 24. The group of output devices includes a driving device 28, a braking device 30, a steering device 32 and an HMI 34. The estimating device 36 according to the present embodiment is configured of, for example, the main control device 12, the external environment sensors 14, the navigation device 16, the positioning device 18, the receiving device 20 and the vehicle body behavior sensor 22.

1.1.1. Input Device Group Configuration

The external environment sensors 14 include a plurality of cameras 40, a plurality of radars 42, and a plurality of LiDARs 44. The cameras 40 image the surroundings of the first moving body 120 and outputs image information to the main control device 12. The radars 42 and the LiDARs 44 detect objects around the first moving body 120 and output the detected information to the main control device 12.

The navigation device 16 measures the position of the first moving body 120 using GPS, and generates a planned travel route from the position of the first moving body 120 to the destination designated by the driver. The navigation device 16 outputs the route information indicating the planned travel route to the main control device 12.

The positioning device 18 includes a GNSS 46, an IMU 48, and a map DB 50. The positioning device 18 measures the position of the first moving body 120 using the GNSS 46 and IMU 48, and outputs the positional information on the position of the first moving body 120 to the main control device 12. Further, the positioning device 18 outputs the map information stored in the map DB 50 to the main control device 12. The map information stored in the map DB 50 is more accurate than the map information stored in the navigation device 16, and includes various information (information on each of lanes, etc.).

The receiving device 20 includes first to third reception terminals (not shown). The first reception terminal receives wide area information broadcast by the broadcasting station. The second reception terminal receives local information transmitted from roadside units installed on a road 130 (FIG. 5). The third reception terminal receives information transmitted from traffic participants other than the first moving body 120. The first to third reception terminals output various received information to the main control device 12.

The vehicle body behavior sensor 22 includes different sensors for measuring the behavior (speed V, acceleration, yaw rate, etc.) of the first moving body 120. Each sensor outputs its detected information to the main control device 12.

The operation sensors 24 include an automation switch 52. The automation switch 52 outputs instruction information that instructs actuation or deactivation of the automated control of either the speed V or the steering, to the main control device 12 according to the switching operation performed by the driver. The operation sensors 24 further include various sensors for detecting the operation amounts of the drive control components (accelerator pedal, brake pedal, steering wheel).

1.1.2. Configuration of Main Control Device 12

The main control device 12 is configured by an ECU. The main control device 12 includes an input/output device 56, a calculation device 58 and a storage device 60. The input/output device 56 has an A/D conversion circuit, a communication interface, and the like. The calculation device 58 has a processor such as a CPU. The calculation device 58 realizes various functions by running programs stored in the storage device 60. Various functions of the calculation device 58 will be described below in [1.1.4]. The storage device 60 has a RAM, a ROM and the like. The storage device 60 stores various programs and numerical information such as threshold values used in the processing performed by the calculation device 58. Additionally, the storage device 60 stores scene-risk information 88. The scene-risk information 88 will be described below in [1.1.5].

1.1.3. Output Device Group Configuration

The driving device 28 includes a drive force output ECU and a control target of the drive force output ECU (both not shown). The driving device 28 adjusts the drive force according to instruction information (drive instruction) output by the main control device 12.

The braking device 30 includes a braking ECU and a control target of the braking ECU (both not shown). The braking device 30 adjusts the braking force according to instruction information (braking instruction) output by the main control device 12.

The steering device 32 includes an EPS (electric power steering) ECU and a control target of the EPS ECU (both not shown). The steering device 32 adjusts the amount of steering according to instruction information (steering instruction) output by the main control device 12.

The HMI 34 includes a display device 62 and an audio device 64. The display device 62 outputs an image according to instruction information (notification instruction) output by the main control device 12. The audio device 64 outputs voice according to instruction information (notification instruction) output by the main control device 12.

1.1.4. Various Functions of Calculation Device 58

Figure 2:
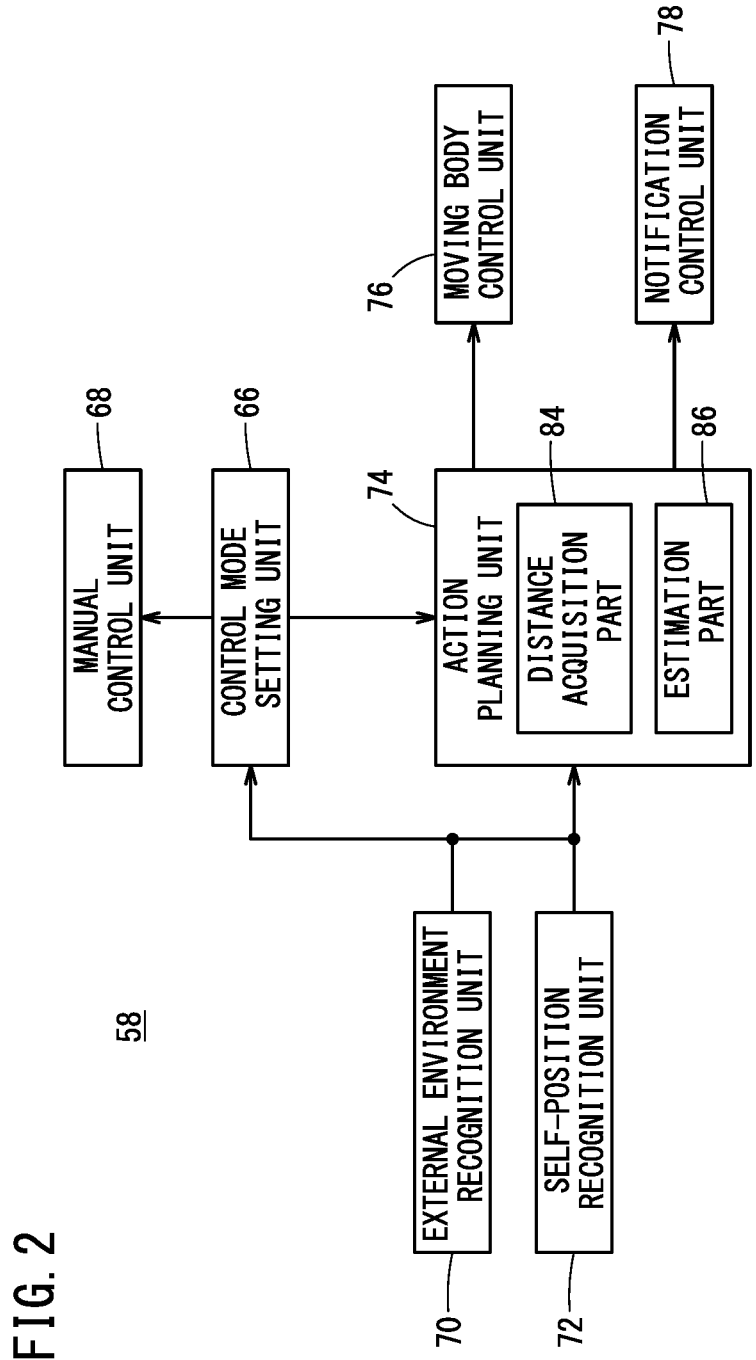
FIG. 2 is a functional block diagram of a calculation unit of a first embodiment.

Various functions realized by the calculation device 58 will be described with reference to FIG. 2. The calculation device 58 has the functions of a control mode setting unit 66, a manual control unit 68, an external environment recognition unit 70, a self-position recognition unit 72, an action planning unit 74, a moving body control unit 76 and a notification control unit 78.

The control mode setting unit 66 determines that each kind of travel control (speed V control and steering control) should be done in manual mode or automated mode, according to the operation performed by the automation switch 52.

The manual control unit 68 performs travel control related to manual control according to the amounts of operations of the drive control components (accelerator pedal, brake pedal, steering wheel) output from the operation sensors 24. The manual control unit 68 outputs instruction information (drive instruction, braking instruction, steering instruction) related to manual control to the driving device 28, the braking device 30 and the steering device 32.

The external environment recognition unit 70 recognizes the environment around the first moving body 120 based on the image information and the detection information output from the external environment sensors 14. The self-position recognition unit 72 recognizes the position of the first moving body 120 based on the positional information and the map information output by the positioning device 18.

The action planning unit 74 makes an action plan related to automatic control based on the recognition result from the external environment recognition unit 70 and the recognition result from the self-position recognition unit 72. For example, the action planning unit 74 generates a local map (dynamic map) including static information and dynamic information around the first moving body 120. Then, the action planning unit 74 determines the optimal action based on the local map and the state (speed V, steering angle, position) of the first moving body 120, and determines the speed V and the travel trajectory for realization of the action.

The action planning unit 74 includes a distance acquisition part 84 and an estimation part 86. The distance acquisition part 84 and the estimation part 86 perform processing related to estimation of the degree of risk. The distance acquisition part 84 acquires a first distance D1 from the first moving body 120 and a second distance D2 that is longer than the first distance D1. The estimation part 86 determines the distance, designated at D, from the first moving body 120 to a traffic participant ahead of the first moving body 120, and estimates the degree of risk corresponding to the distance D. The action planning unit 74 determines whether the first moving body 120 should move forward or stop, based on the degree of risk estimated by the estimation part 86, and calculates an appropriate speed V when it is determined to move forward.

In the present embodiment, the traffic participant ahead of the first moving body 120 refers to a second moving body 122 running toward an intersection 132 to which the first moving body 120 advances, as shown in FIG. 5. Further, in the present embodiment, the degree of risk is the possibility that the first moving body 120 and the second moving body 122 come into contact with each other in the intersection 132. In this embodiment, the degree of risk is simply classified as two values. When the first moving body 120 and the second moving body 122 may come into contact with each other, the degree of risk is set to "1". When there is no possibility that the first moving body 120 and the second moving body 122 come into contact with each other, the degree of risk is set to "0". In the present embodiment, when the (planned) travel trajectory of the first moving body 120 and the (estimated) travel trajectory of the second moving body 122 intersect, it is determined that there is a risk that the first moving body 120 and the second moving body 122 come into contact with each other. On the other hand, in the present embodiment, when the (planned) advancing direction of the first moving body 120 after passing through the intersection 132 coincides with the (estimated) advancing direction of the second moving body 122 after passing through the intersection 132, it is determined that the first moving body 120 and the second moving body 122 may come into contact with each other.

The moving body control unit 76 performs travel control related to automated control according to the action plan. For example, the moving body control unit 76 calculates the acceleration for driving the first moving body 120 at the speed V that is calculated by the action planning unit 74. Further, the moving body control unit 76 calculates the steering angle for driving the first moving body 120 along the travel trajectory obtained by the action planning unit 74. The moving body control unit 76 outputs instruction information (drive instruction, braking instruction, steering instruction) related to automated control to the driving device 28, the braking device 30 and the steering device 32. The notification control unit 78 outputs instruction information (notification instruction) to the HMI 34 when a notification arises in the action plan.

1.1.5. Scene-Risk Information 88

Referring to FIGS. 3 and 4A to 4E, the scene-risk information 88 stored in the storage device 60 will be described. The scene-risk information 88 associates a scene specified by the geometry of the road 130, the position of the first moving body 120 and the position of the second moving body 122, with the degree of risk of the contact between the first moving body 120 and the second moving body 122.

The scene-risk information 88 shown in FIG. 3 includes scene information 90 and risk information 92. The scene information 90 includes first to fifth information 94 to 102. The first information 94 indicates the geometry of a road 130, specifically, an intersection 132 as shown in FIG. 4A and other figures. The second information 96 indicates the position of the first moving body 120, specifically, the position of the lane in which the first moving body 120 travels before entering the intersection 132. The third information 98 indicates the advancing direction of the first moving body 120, specifically, the direction in which the first moving body 120 passes through the intersection 132 and advances. The fourth information 100 indicates the position of the second moving body 122, specifically, the position of the lane in which the second moving body 122 travels before entering the intersection 132. The fifth information 102 indicates the advancing direction of the second moving body 122, specifically, the direction of the direction indicator of the second moving body 122. The risk information 92 indicates the degree of risk presumed from the scene presented by the scene information 90.

1.2. Outline of the Present Embodiment

The outline of the present embodiment will be described with reference to FIG. 5. When the first moving body 120 passes through the intersection 132, the estimation part 86 estimates the degree of risk for each of second moving bodies 122. At this time, the estimation part 86 changes the way of estimating the degree of risk depending on the distance D between the first moving body 120 and the second moving body 122.

When the separation distance D between the first moving body 120 and the second moving body 122 is equal to or less than the first distance D1, the estimation part 86 estimates the degree of risk based on the behavior (speed, acceleration and advancing direction) of the second moving body 122. This estimation will be called the primary estimation.

When the separation distance D between the first moving body 120 and the second moving body 122 is equal to or greater than the second distance D2 (>D1), the estimation part 86 estimates the degree of risk based on the scene at that moment. This estimation will be called the secondary estimation.

When the separation distance D between the first moving body 120 and the second moving body 122 is greater than the first distance D1 and less than the second distance D2, the estimation part 86 performs both the primary estimation and the secondary estimation, and selects the estimation result with higher reliability from the two estimation results. This estimation will be called the tertiary estimation.

1.3. Processing Performed by Estimating Device 36

1.3.1. Main Process

Figure 6:
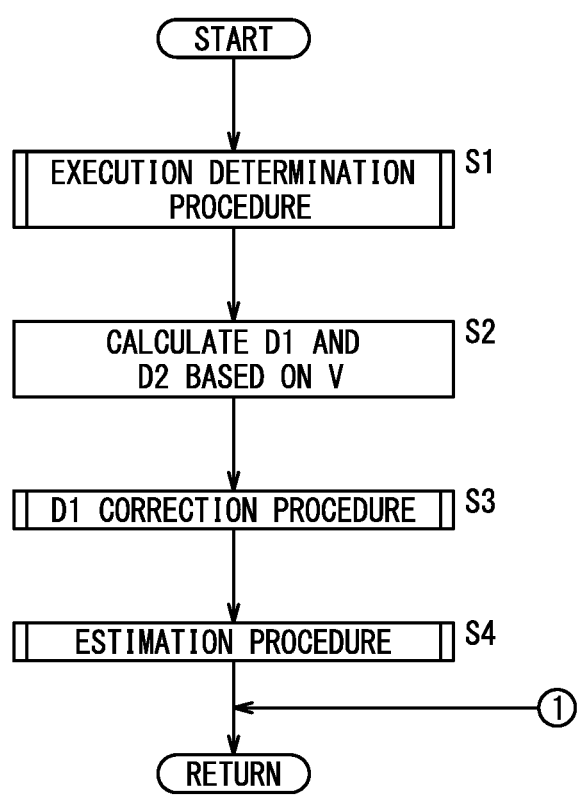
FIG. 6 is a flowchart of a main process.

The main process will be described with reference to FIG. 6. The main process shown in FIG. 6 is implemented at predetermined time intervals.

Figure 7:
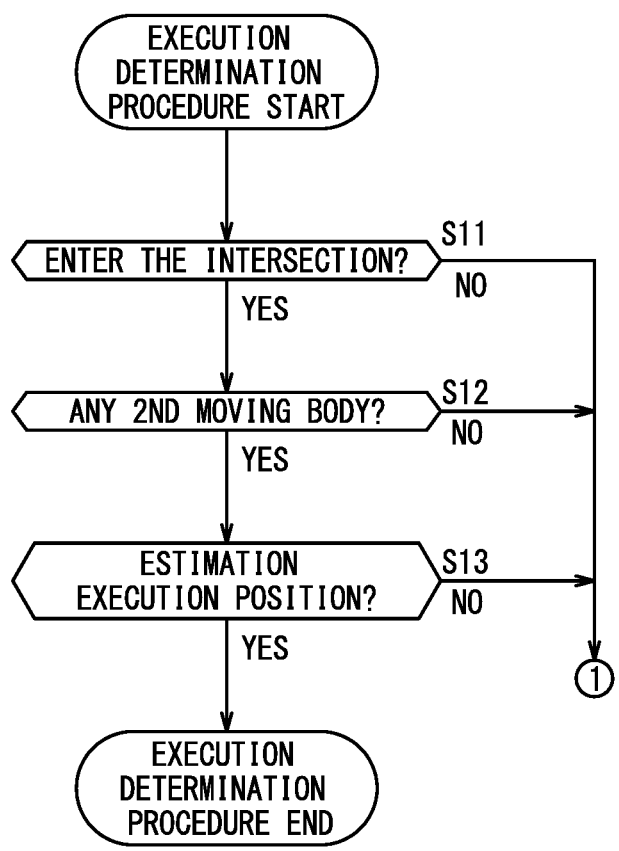
FIG. 7 is a flowchart of an execution determination procedure.

At step S1, the estimation part 86 performs an execution determination procedure for determining whether or not it is time to execute the estimation process (step S4). The execution determination procedure will be described below in [1.3.2] (FIG. 7). When the procedure at step S1 is completed, the process proceeds to step S2.

At step S2, the distance acquisition part 84 acquires the speed V of the first moving body 120 based on the detection result from the speed sensor (vehicle body behavior sensor 22). Then, the distance acquisition part 84 acquires the first distance D1 and the second distance D2 greater than the first distance D1, depending on the speed V. The first distance D1 is the sum of a first predetermined distance and a first variable distance. The second distance D2 is the sum of a second predetermined distance and a second variable distance. The first predetermined distance and the second predetermined distance are stored in advance in the storage device 60. The first variable distance and the second variable distance are determined according to the speed V. For example, the distance acquisition part 84 can obtain the first variable distance and the second variable distance by multiplying the velocity V by a predetermined coefficient. The predetermined coefficient used when obtaining the first variable distance and the predetermined coefficient used when obtaining the second variable distance may be the same or different. When the procedure at step S2 is completed, the process proceeds to step S3.

Figure 8:
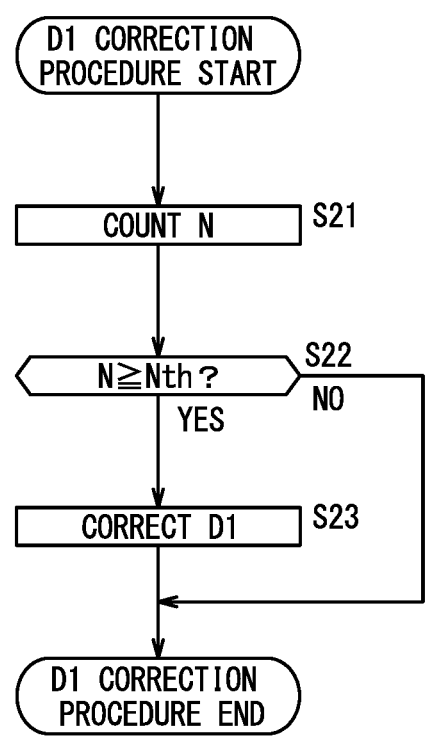
FIG. 8 is a flowchart of a D1 correction procedure.

At step S3, the estimation part 86 performs a D1 correction procedure for correcting the first distance D1 calculated at step S2. The D1 correction procedure will be described below in [1.3.3] (FIG. 8). When the procedure at step S3 is completed, the process proceeds to step S4.

Figure 9:
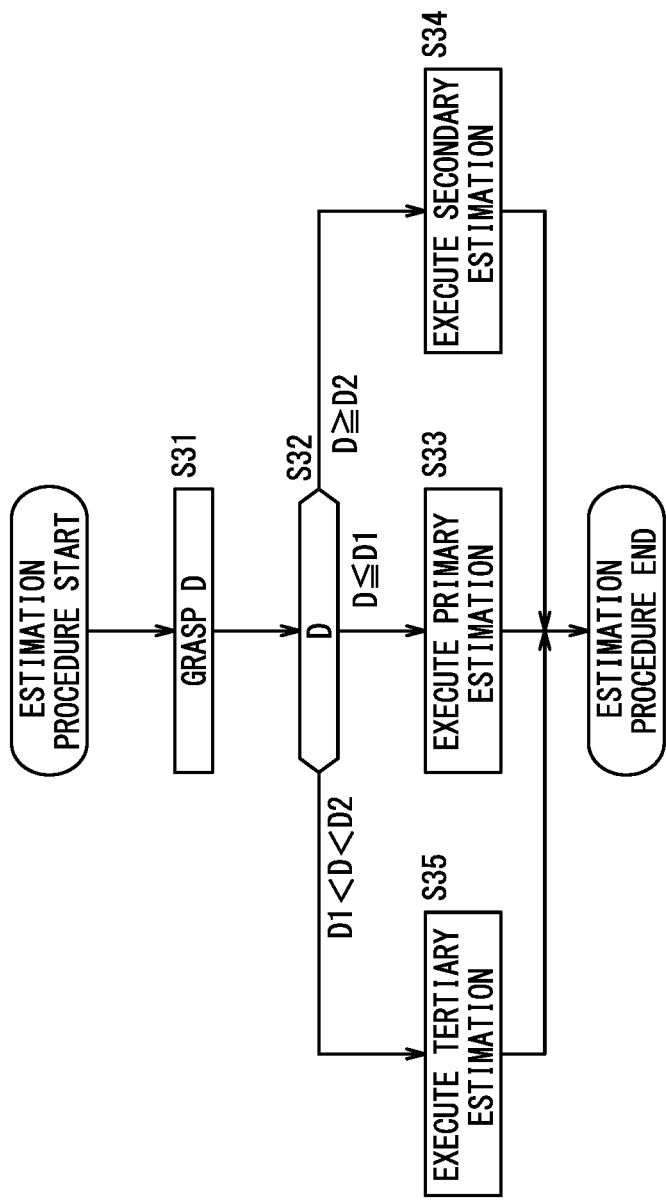
FIG. 9 is a flowchart of an estimation procedure.

At step S4, the estimation part 86 performs an estimation procedure for estimating the degree of risk for each of the second moving bodies 122. The estimation procedure will be described below in [1.3.4] (FIG. 9). When the procedure at step S4 is completed, the main process ends.

1.3.2. Execution Determination Procedure

The execution determination procedure performed at step S1 in FIG. 6 will be described with reference to FIG. 7.

At step S11, the estimation part 86, based on the recognition result from the self-position recognition unit 72, determines whether or not the first moving body 120 enters the intersection 132. When the first moving body 120 enters the intersection 132 (step S11: YES), the procedure proceeds to step S12. On the other hand, when the first moving body 120 is not in a situation of entering the intersection 132 (step S11: NO), the main process shown in FIG. 6 ends.

At step S12, the estimation part 86, based on the recognition result from the external environment recognition unit 70, determines whether or not there is a second moving body 122 traveling toward the intersection 132. When there is a second moving body 122 (step S12: YES), the procedure proceeds to step S13. On the other hand, when there is no second moving body 122 (step S12: NO), the main process shown in FIG. 6 ends.

At step S13, the estimation part 86, based on the recognition result from the self-position recognition unit 72, determines whether or not the first moving body 120 is present at a position (estimation execution position) where the degree of risk should be estimated. In the present embodiment, the estimation execution position is a boundary position Pb in the intersection 132. The boundary position Pb referred to herein is the border where the first moving body 120 passes through when entering from the outside to the inside of the intersection 132. When the first moving body 120 is located at the estimation execution position (step S13: YES), the execution determination procedure ends, and the process proceeds to step S2 of FIG. 6. On the other hand, when the first moving body 120 is not located at the estimation execution position (step S13: NO), the main process shown in FIG. 6 ends.

1.3.3. D1 Correction Procedure

The D1 correction procedure performed at step S3 in FIG. 6 will be described with reference to FIG. 8.

At step S21, the estimation part 86 counts the number of second moving bodies 122 (moving body count N) traveling in an oncoming lane, designated at 134, within the first distance D1 based on the recognition result from the external environment recognition unit 70. When the processing at step S21 is completed, the procedure proceeds to step S22.

At step S22, the estimation part 86 compares the number of moving bodies N with a predetermined threshold Nth. When the number of moving bodies N is equal to or greater than the threshold Nth (step S22: YES), the procedure proceeds to step S23. On the other hand, when the number of moving bodies N is less than the threshold Nth (step S22: NO), the D1 correction procedure ends, and the process proceeds to step S4 of FIG. 6. In this case, the first distance D1 is kept as is without being corrected.

At step S23, the estimation part 86 corrects the first distance D1. When there are many second moving bodies 122 within the first distance D1, the estimation part 86 needs to implement the primary estimation for many second moving bodies 122, which increases the calculation load on the calculation device 58. To deal with this, the estimation part 86 thins out the second moving bodies 122 to be subjected to the primary estimation by shortening the first distance D1 in order to alleviate the calculation load. Predetermined reduction ratios are stored in the storage device 60, and the estimation part 86 reduces the first distance D1 by multiplying the first distance D1 with a reduction ratio. The reduction ratio may be a constant value or a value determined according to the number of moving bodies N. For example, as the number of moving objects N increases, the reduction ratio may be reduced. When the processing at step S23 is completed, the D1 correction procedure is completed, and the process proceeds to step S4 of FIG. 6.

1.3.4. Estimation Procedure

The estimation procedure performed at step S4 in FIG. 6 will be described with reference to FIG. 9.

At step S31, the estimation part 86, based on the recognition result from the external environment recognition unit 70, grasps the distance D from the first moving body 120 to each of all the recognized second moving bodies 122. When the procedure at step S31 is completed, the processing proceeds to step S32.

At step S32, the estimation part 86 determines which of the primary estimation to the tertiary estimation is used to estimate the degree of risk for each of the second moving bodies 122. When the separation distance D is equal to or less than the first distance D1 (step S32: D<D1), the processing proceeds to step S33. When the separation distance D is the second distance D2 or greater (step S32: D D2), the processing proceeds to step S34. When the separation distance D is greater than the first distance D1 and less than the second distance D2 (step S32: D1<D<D2), the processing proceeds to step S35.

At step S33, the estimation part 86 determines the degree of risk by the primary estimation that presents high accuracy. Here, an example of the primary estimation will be described. The estimation part 86 estimates the travel trajectory when the second moving body 122 passes through the intersection 132, based on the optical flow of the second moving body 122 and the operating state of the direction indicator. Also, the estimation part 86 generates a (planned) traveling trajectory when the first moving body 120 passes through the intersection 132. When the two traveling trajectories intersect or come close to each other, the estimation part 86, based on the speed and acceleration of the second moving body 122, calculates the time at which the second moving body 122 will reach the intersecting point or a close point between the two traveling trajectories. Similarly, the estimation part 86 calculates the time at which the first moving body 120 will reach the intersecting point or the close point of the two traveling trajectories, based on the velocity V and the acceleration of the first moving body 120. Then, the estimation part 86 determines the time difference between the two times, and estimates the risk level as "1" when the time difference is within a predetermined time, and sets the risk level as "0" when the time difference is the predetermined time or longer. The estimation part 86 estimates the risk level as "0" even when the two traveling trajectories do not intersect and are not close to each other. When the procedure at step S33 is completed, the estimation processing is completed.

At step S34, the estimation part 86 determines the degree of risk by the secondary estimation that operates with a low calculation load. Here, an example of the secondary estimation will be described. The estimation part 86 determines the scene at that moment as follows. The estimation part 86 identifies the geometry of the road 130 (intersection 132) based on the recognition result from the external environment recognition unit 70 or the information from the map DB 50. The estimation part 86 also identifies the lane in which the first moving body 120 runs based on the recognition result from the external environment recognition unit 70 or the recognition result from the self-position recognition unit 72. Further, the estimation part 86 identifies the advancing direction of the first moving body 120 according to the running state at that moment (for example, running toward the destination or running along the road). Further, the estimation part 86 identifies the lane in which the second moving body 122 runs and the operating status of the direction indicator, based on the recognition result from the external environment recognition unit 70. The estimation part 86 identifies the scene in the above way, and compares the thus identified scene with the scene information 90 in the scene-risk information 88. Then, the estimation part 86 outputs the degree of risk associated with the scene information 90 that matches with the identified scene as the estimation result. When the processing at step S34 is completed, the estimation procedure is completed.

At step S35, the estimation part 86 determines the degree of risk by the tertiary estimation. As described above, the tertiary estimation is an estimation method that performs both the primary estimation and the secondary estimation, and selects the one with the higher reliability when the two estimation results are different. The reliability may be judged by artificial intelligence or may be judged based on predetermined patterns. For example, the estimation part 86 basically judges that the primary estimation has a higher reliability, and judges that the secondary estimation is more reliable when the scene corresponds to one of exceptional patterns. As an example of exceptional patterns, the current scene markedly deviates from the typical patterns, for example, in a case where the amount of deviation of the center of the second moving body 122 from the center of the lane is greater than a predetermined value, in a case where the time change of the amount of deviation is greater than a predetermined value, or other cases. Another example of exceptional patterns is a case where the degree of recognition of the target second moving body 122 is low (when not many parts can be recognized, etc.). The exceptional patterns are stored in the storage device 60 in advance. When the processing at step S35 is completed, the estimation procedure ends.

2. Modifications

There are various modifications of the above-described embodiment. Some modifications will be described below. It should be noted that the above-described embodiment and each of modifications described below can be appropriately combined or substituted.

2.1. Modification 1: Execution Determination Procedure

Figure 10:
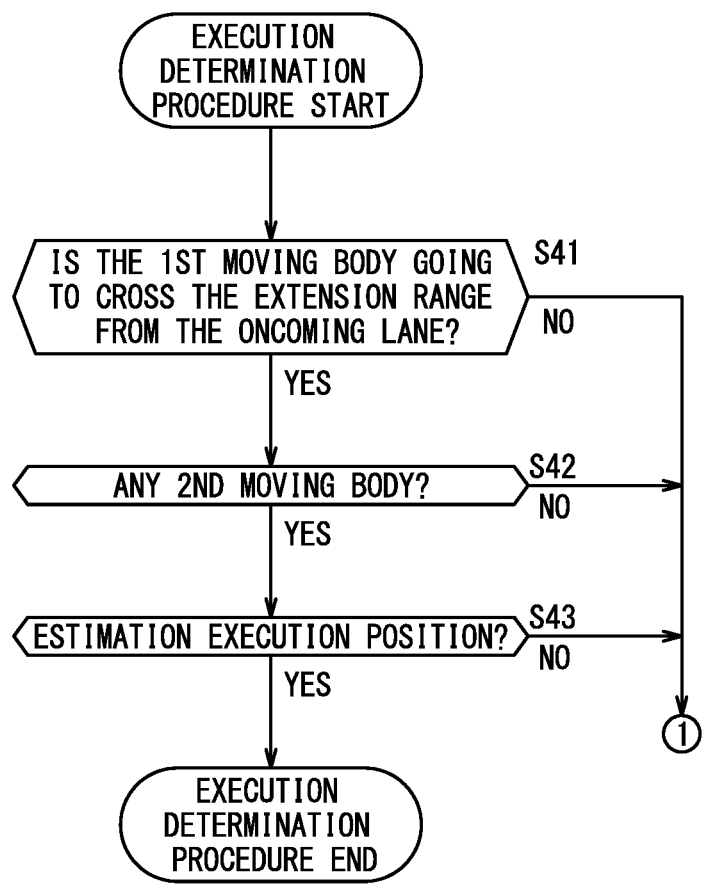
FIG. 10 is a flowchart of an execution determination procedure different from that of FIG. 7.

At step S1 shown in FIG. 6, instead of performing the execution determination procedure shown in FIG. 7, the execution determination procedure shown in FIG. 10 may be performed. Of the processing shown in FIG. 10, the processing at steps S42 and S43 is the same as the processing at steps S12 and S13 shown in FIG. 7. Therefore, only step S41 will be described below.

At step S41, the estimation part 86 determines whether or not the first moving body 120 crosses an extension range 136 from the oncoming lane 134. That is, the estimation part 86 determines whether or not the first moving body 120 turns right in the intersection 132 in case of left-hand traffic, and determines whether or not the first moving body 120 turns left in the intersection 132 in case of right-hand traffic. When the first moving body 120 crosses the extension range 136 from the oncoming lane 134 (step S41: YES), the processing proceeds to step S42. On the other hand, when the first moving body 120 does not cross the extension range 136 from the oncoming lane 134 (step S41: NO), the main process shown in FIG. 6 ends.

2.2. Modification 2: Target Lane Determination Procedure

Figure 11:
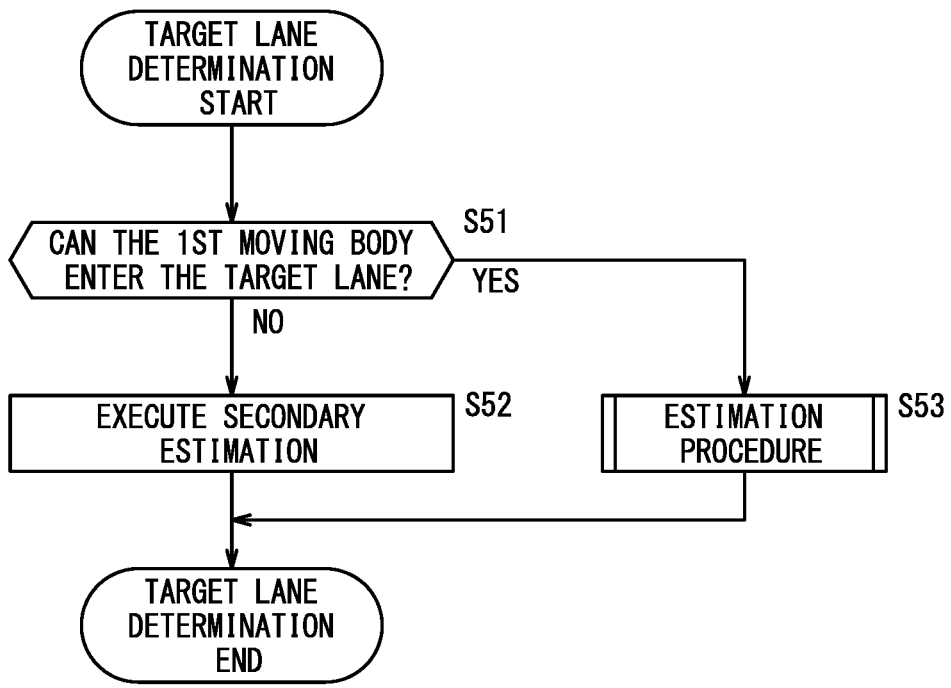
FIG. 11 is a flowchart of a procedure for target lane determination.

At step S4 shown in FIG. 6, instead of performing the estimation procedure shown in FIG. 9, a target lane determination procedure shown in FIG. 11 may be performed. At step S51, the estimation part 86 determines whether or not the first moving body 120 can enter a target lane 138.

Specifically, the estimation part 86 determines whether or not there exists a third moving body 124 that is stopping within a predetermined range on the target lane 138. The target lane 138 is the lane which the first moving body 120 enters after exiting the intersection 132. The predetermined range refers to a range within a predetermined distance in the advancing direction from the entrance of the target lane 138, that is, the boundary between the intersection 132 and the target lane 138. As the predetermined distance, for example, a length equal to or less than the vehicle length of the first moving body 120 is designated. When the third moving body 124 is stopping within the predetermined range and the first moving body 120 cannot enter the target lane 138 (step S51: NO), the procedure proceeds to step S52. As a specific example, there is a situation where the target lane 138 is congested. On the other hand, when the third moving body 124 does not stop within the predetermined range and the first moving body 120 can enter the target lane 138 (step S51: YES), the procedure proceeds to step S53.

At step S52, the estimation part 86 examines the degrees of risk for all the second moving bodies 122 by the secondary estimation. When the first moving body 120 cannot enter the target lane 138, it stops. In this case, the risk estimation accuracy does not need to be high. Therefore, the estimation part 86 does not perform the primary estimation that presents high accuracy, but preferentially performs the secondary estimation that operates with a low calculation load.

At step S53, the estimation part 86 performs the estimation procedure shown in FIG. 9.

2.3. Modification 3

In the above-described embodiment, the estimation part 86 estimates the degree of risk at the boundary position Pb of the intersection 132. However, the estimation execution position can be set as appropriate. For example, the estimation part 86 may make a first-time estimation of the degree of risk when the first moving body 120 approaches the intersection 132 and reaches the boundary position Pb, then and a second-time estimation of the degree of risk when the first moving body 120 crosses the extension range 136 of the oncoming lane 134. When the estimation part 86 makes plural estimations while the first moving body passes through the intersection 132, the estimation part 86 may use the estimation result of the secondary estimation at the first-time estimation for estimation at the second-time and subsequent estimations.

2.4. Modification 4

When the oncoming lane 134 is congested, the estimation part 86 may estimate the degrees of risk only for the second moving bodies 122 whose distances D from the first moving body 120 are equal to or less than the first distance D1. In this case, the estimation part 86 determines the degree of risk by the primary estimation. The estimation part 86 determines whether a congestion of traffic is occurring based on the speeds or density of the second moving bodies 122, and the like.

2.5. Modification 5

In the above-described embodiment, the first moving body 120 including the estimating device 36 has a drive supporting function or an automated driving function. However, the first moving body 120 including the estimating device 36 does not have to have a drive supporting function or an automated driving function. In this case, the degree of risk is used in a way other than the determination related to the driving of the first moving body 120. For example, the degree of risk is notified to the vehicle occupant.

3. Second Embodiment

In the above-described embodiment and modifications, an estimation part 86 changes the method of estimating the degree of risk according to the distance D between the first moving body 120 and the second moving body 122. Instead, the estimation part 86 may change the method of estimating the degree of risk according to the expected approach time between the first moving body 120 and the second moving body 122.

Figure 12:
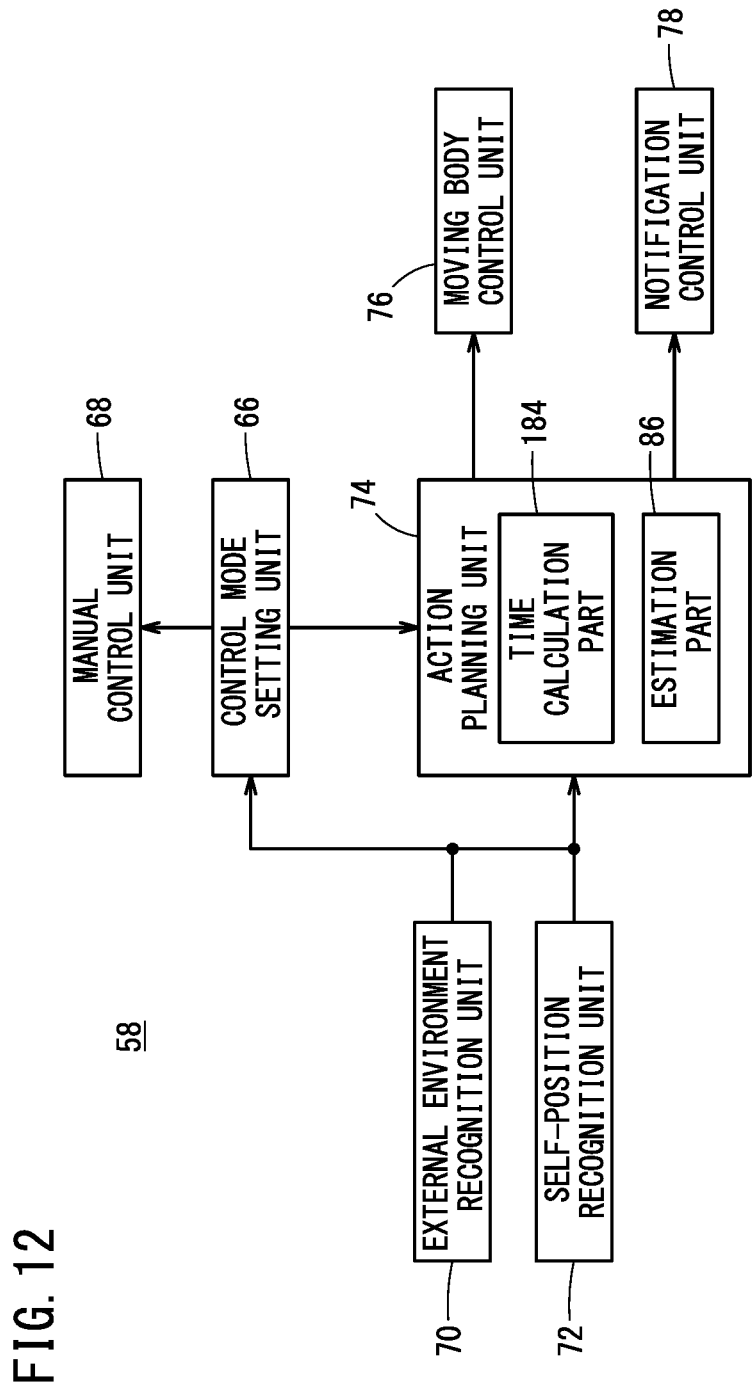
FIG. 12 is a functional block diagram of a calculation unit of a second embodiment.

In this case, as shown in FIG. 12, the action planning unit 74 includes a time calculation part 184 and the estimation part 86 to perform processing related to the estimation of the degree of risk. The time calculation part 184 calculates the expected approach time for the first moving body 120 to come close to each of the second moving bodies 122 on the oncoming lane 134.

The estimation part 86 estimates the degree of risk by the primary estimation for a second moving body 122 whose expected approach time is equal to a first time or shorter. The estimation part 86 estimates the degree of risk by the secondary estimation for a second moving body 122 whose expected approach time is equal to or longer than a second time that is longer than the first time. In addition, the estimation part 86 estimates the degree of risk by the tertiary estimation for a second moving body 122 whose expected approach time is longer than the first time and less than the second time.

Also in the second embodiment, the modifications of the first embodiment can be appropriately applied.

4. Other Embodiments

In the first embodiment and its modifications, the estimation part 86 does not have to perform the tertiary estimation. For example, when the distance D between the first moving body 120 and the second moving body 122 is greater than the first distance D1 and less than the second distance D2, the estimation part 86 may perform the primary estimation or the secondary estimation. Similarly, in the second embodiment and its modifications, the estimation part 86 does not have to perform the tertiary estimation. For example, when the expected approach time between the first moving body 120 and the second moving body 122 is longer than the first time and less than the second time, the estimation part 86 may perform the primary estimation or the secondary estimation.

5. Technical Thought Obtained from the Embodiment

The technical ideas that can be grasped from the above embodiments and modifications are described below.

According to the first aspect of the invention, the estimating device 36 includes: the external environment recognition unit 70 configured to recognize the environment around the moving body (first moving body 120); the distance acquisition unit 84 configured to acquire the first distance D1 from the first moving body 120 and the second distance D2 that is longer than the first distance; the scene storage unit (storage device 60) configured to store scenes which each are specified by the geometry of the road 130, the position of the moving body and the position of the traffic participant (second moving body 122) around the moving body, in association with the degrees of risk relating to contact between the moving body and the traffic participant; and the estimation part 86 configured to perform a primary estimation which estimates the degree of risk with the traffic participant whose separation distance D from the moving body is equal to or shorter than the first distance D1, based on the speed of the traffic participant, the acceleration of the traffic participant, and the advancing direction of the traffic participant, and perform a secondary estimation which estimates the degree of risk with the traffic participant whose separation distance D is equal to or greater than the second distance D2, based on the scene at that moment.

In the above configuration, the estimation part 86 performs the primary estimation that presents high accuracy, on the second moving body 122 whose separation distance D from the first moving body 120 is short, and performs the secondary estimation that operates with a low calculation load, on the second moving body 122 whose separation distance D from the first moving body 120 is long. In this way, the estimation part 86 changes the methods of estimating the degree of risk between the second moving body 122 needing high-accuracy estimation (the second moving body 122 whose separation distance D is short) and the second moving body 122 that does not need high-accuracy estimation (the second moving body 122 whose separation distance D is long). Therefore, according to the above configuration, it is possible to reduce the load of the calculation performed to estimate the risk of contact between the moving body (the first moving body 120) and the traffic participant (the second moving body 122).

In the first aspect of the invention, the estimation part 86 is configured to perform both the primary estimation and the secondary estimation with respect to the traffic participant (the second moving body 122) whose separation distance D is greater than the first distance D1 and is shorter than the second distance D2, and select an estimation result with higher reliability from the estimation results of the primary and secondary estimations, as the estimation result of the degree of risk.

In the first aspect of the invention, in a situation where the traffic participant (the second moving body 122) moves in an oncoming lane 134 toward an intersection 132, the estimation part 86 is configured to make a first-time estimation of the degree of risk when the moving body (the first moving body 120) reaches the boundary position Pb of the intersection 132 from the outside of the intersection 132, then make a second-time estimation of the degree of risk when the moving body crosses an extension range 136 that is extended from the oncoming lane 134, and use an estimation result of the secondary estimation at the first-time estimation, also in the second-time estimation.

According to the above configuration, since the estimation result of the secondary estimation at the first-time estimation is also used in the second-time estimation, the calculation load of the second-time estimation is reduced.

In the first aspect of the invention, in a situation where the traffic participant (the second moving body 122) moves in an oncoming lane 134 toward an intersection 132, and the moving body (the first moving body 120) is going to cross an extension range 136 that is extended from the oncoming lane 134 in the intersection 132 and enter a target lane 138 ahead of the intersection 132, the estimation part 86 is configured, not to perform the primary estimation, but perform the secondary estimation also for the traffic participant (the second moving body 122) whose separation distance D is equal to or shorter than the first distance D1 when the estimation part 86 estimates the degree of risk and recognizes that the moving body cannot enter the target lane 138 because another traffic participant (third moving body 124) is stopping within a predetermined range of the target lane 138.

According to the above configuration, the estimation part 86 performs the secondary estimation that operates with a low calculation load, on a nearby second moving body 122 in a situation where high-precision estimation is not required. Therefore, according to the above configuration, the calculation load of risk estimation can be reduced.

In the first aspect of the invention, the estimation part 86 is configured to change the first distance D1 to a shorter distance and then estimate the degree of risk when the number (moving body count N) of the traffic participants (the second moving bodies 122) whose separation distance D is equal to or shorter than the first distance D1 is greater than a predetermined number (threshold Nth).

When there are many second moving bodies 122 to be subjected to the primary estimation, the accuracy of the primary estimation lowers. By changing the first distance D1 to a shorter distance as in the above configuration, the number of the second moving bodies 122 to be subjected to the primary estimation can be reduced. As a result, it is possible to suppress decrease in the accuracy of the primary estimation.

In the first aspect of the invention, the first distance D1 is the sum of a first predetermined distance and a first variable distance determined depending on the speed V of the moving body (the first moving body 120) while the second distance D2 is the sum of a second predetermined distance that is longer than the first predetermined distance and a second variable distance determined depending on the speed V of the moving body.

According to the second aspect of the invention, the estimating device 36 includes: the external environment recognition unit 70 configured to recognize the environment around the moving body (first moving body 120); the time calculation part 184 configured to calculate the expected approach time for the moving body to come close to the traffic participant (the second moving body 122) on the oncoming lane 134; the scene storage unit (storage device 60) configured to store scenes that each are specified by the geometry of the road 130, the position of the moving body and the position of the traffic participant, in association with the degrees of risk relating to contact between the moving body and the traffic participant; and the estimation part 86 configured to perform a primary estimation which estimates the degree of risk with the traffic participant whose expected approach time is equal to or shorter a first time, based on the speed of the traffic participant, the acceleration of the traffic participant, and the advancing direction of the traffic participant, and perform a secondary estimation which estimates the degree of risk with the traffic participant whose expected approach time is equal to or longer a second time that is longer than the first time, based on the scene at that moment.

According to the above configuration, the calculation load of risk estimation can be reduced.

In the second aspect of the invention, the estimation part 86 is configured to perform both the primary estimation and the secondary estimation with respect to the traffic participant (the second moving body 122) whose expected approach time is longer than the first time and shorter than the second time, and select an estimation result with higher reliability from the estimation results of the primary and secondary estimations, as the estimation result of the degree of risk.

The estimating device according to the present invention should not be limited to the above-described embodiments, and it goes without saying that various configurations can be adopted without departing from the gist of the present invention.

What is claimed is:

1. An estimating device, comprising one or more processors that execute computer-executable instructions stored in a memory,
wherein the one or more processors execute the computer-executable instructions to cause the estimating device to:
recognize environment around a moving body;
acquire a first distance from the moving body and a second distance that is longer than the first distance;
store scenes which each are specified by geometry of a road, a position of the moving body and a position of a traffic participant around the moving body, in association with degrees of risk relating to contact between the moving body and the traffic participant;
perform a primary estimation which estimates the degree of risk with the traffic participant whose separation distance from the moving body is equal to or shorter than the first distance, based on a speed of the traffic participant, an acceleration of the traffic participant, and an advancing direction of the traffic participant, and perform a secondary estimation which estimates the degree of risk with the traffic participant whose separation distance is equal to or greater than the second distance, based on the scene at that moment; and
perform both the primary estimation and the secondary estimation with respect to the traffic participant whose separation distance is greater than the first distance and is shorter than the second distance, and select an estimation result with higher reliability from the estimation results of the primary and secondary estimations, as the estimation result of the degree of risk.

2. The estimating device according to claim 1, wherein, in a situation where the traffic participant moves in an oncoming lane toward an intersection, the one or more processors cause the estimating device to make a first-time estimation of the degree of risk when the moving body reaches a boundary position of the intersection from outside of the intersection, then make a second-time estimation of the degree of risk when the moving body crosses an extension range that is extended from the oncoming lane, and use an estimation result of the secondary estimation at the first-time estimation, also in the second-time estimation.

3. The estimating device according to claim 1, wherein the one or more processors cause the estimating device to change the first distance to a shorter distance and then estimate the degree of risk when number of the traffic participants whose separation distance is equal to or shorter than the first distance is greater than a predetermined number.

4. The estimating device according to claim 1, wherein the first distance is a sum of a first predetermined distance and a first variable distance determined depending on a speed of the moving body; and
the second distance is a sum of a second predetermined distance that is longer than the first predetermined distance and a second variable distance determined depending on the speed of the moving body.

5. An estimating device comprising one or more processors that execute computer-executable instructions stored in a memory,
wherein the one or more processors execute the computer-executable instructions to cause the estimating device to:
recognize environment around a moving body;
acquire a first distance from the moving body and a second distance that is longer than the first distance;
store scenes which each are specified by geometry of a road, a position of the moving body and a position of a traffic participant around the moving body, in association with degrees of risk relating to contact between the moving body and the traffic participant;
perform a primary estimation which estimates the degree of risk with the traffic participant whose separation distance from the moving body is equal to or shorter than the first distance, based on a speed of the traffic participant, an acceleration of the traffic participant, and an advancing direction of the traffic participant, and perform a secondary estimation which estimates the degree of risk with the traffic participant whose separation distance is equal to or greater than the second distance, based on the scene at that moment; and
wherein, in a situation where the traffic participant moves in an oncoming lane toward an intersection, and the moving body is going to cross an extension range that is extended from the oncoming lane in the intersection and enter a target lane ahead of the intersection, the one or more processors cause the estimating device, not to perform the primary estimation, but perform the secondary estimation also for the traffic participant whose separation distance is equal to or shorter than the first distance when the one or more processors cause the estimating device to estimate the degree of risk and recognize that the moving body cannot enter the target lane because another traffic participant is stopping within a predetermined range of the target lane.

6. The estimating device according to claim 5, wherein the one or more processors cause the estimating device to change the first distance to a shorter distance and then estimate the degree of risk when number of the traffic participants whose separation distance is equal to or shorter than the first distance is greater than a predetermined number.

7. The estimating device according to claim 5, wherein the first distance is a sum of a first predetermined distance and a first variable distance determined depending on a speed of the moving body; and
the second distance is a sum of a second predetermined distance that is longer than the first predetermined distance and a second variable distance determined depending on the speed of the moving body.

8. An estimating device, comprising one or more processors that execute computer-executable instructions stored in a memory,
wherein the one or more processors execute the computer-executable instructions to cause the estimating device to:
recognize the environment around a moving body;
calculate the expected approach time for the moving body to come close to a traffic participant on an oncoming lane;
store scenes that each are specified by geometry of a road, a position of the moving body and a position of the traffic participant around the moving body, in association with degrees of risk relating to contact between the moving body and the traffic participant;

perform a primary estimation which estimates the degree of risk with the traffic participant whose expected approach time is equal to or shorter a first time, based on a speed of the traffic participant, an acceleration of the traffic participant, and an advancing direction of the traffic participant, and perform a secondary estimation which estimates the degree of risk with the traffic participant whose expected approach time is equal to or longer a second time that is longer than the first time, based on the scene at that moment; and wherein the one or more processors cause the estimating device to perform both the primary estimation and the secondary estimation with respect to the traffic participant whose expected approach time is longer than the first time and shorter than the second time, and select an estimation result with higher reliability from the estimation results of the primary and secondary estimations, as the estimation result of the degree of risk.

* * * * *